United States Patent Office 3,471,298
Patented Oct. 7, 1969

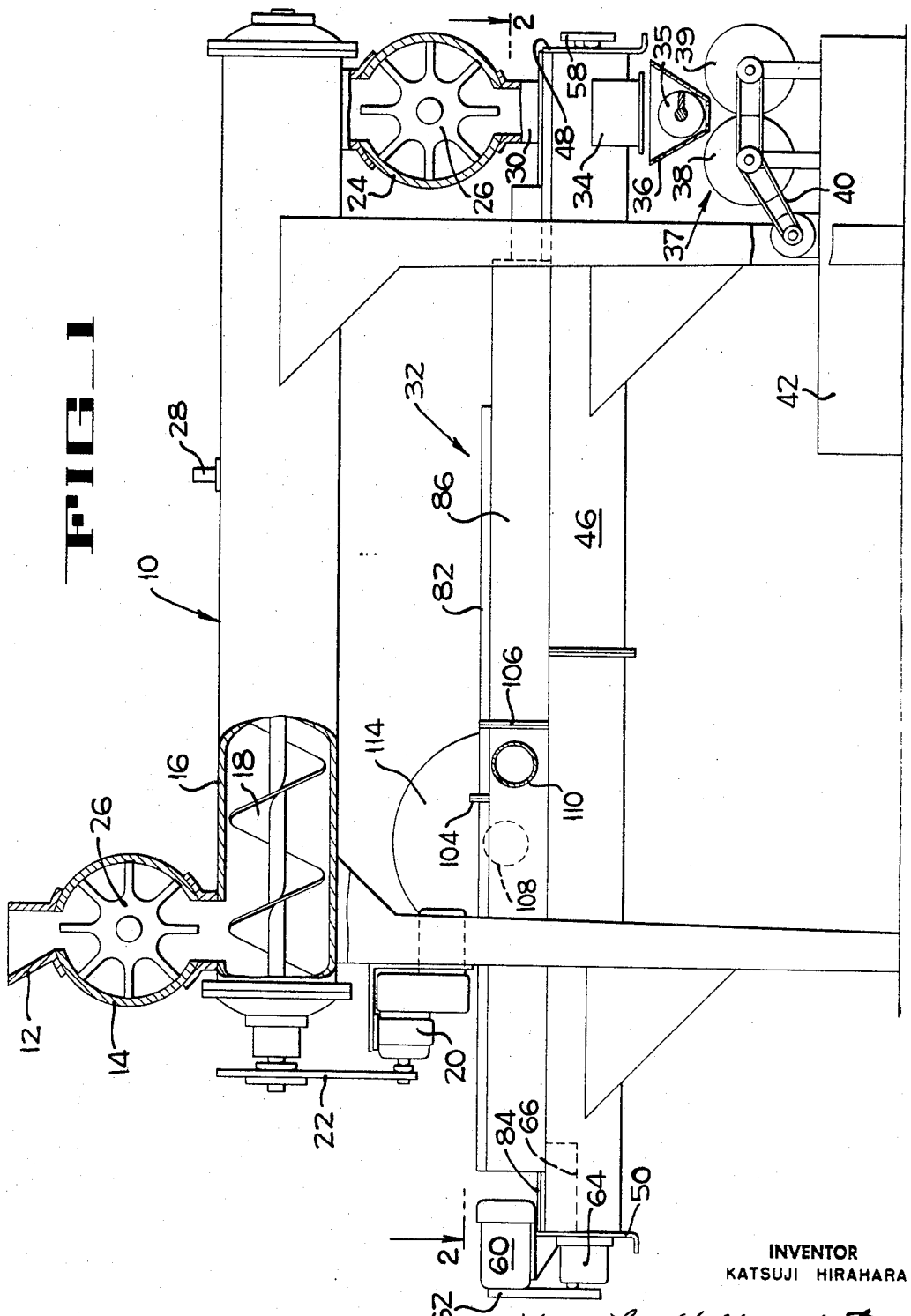

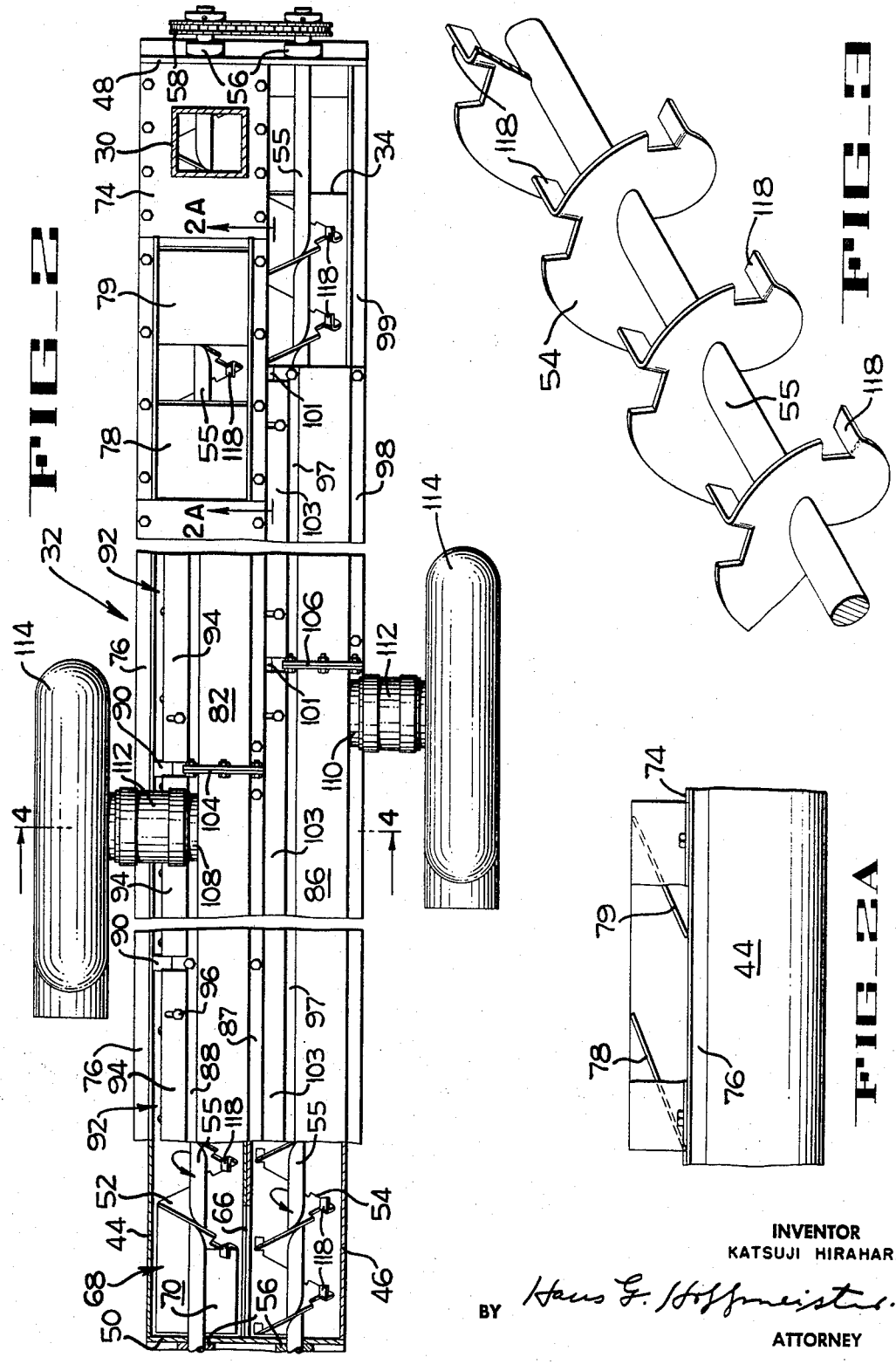

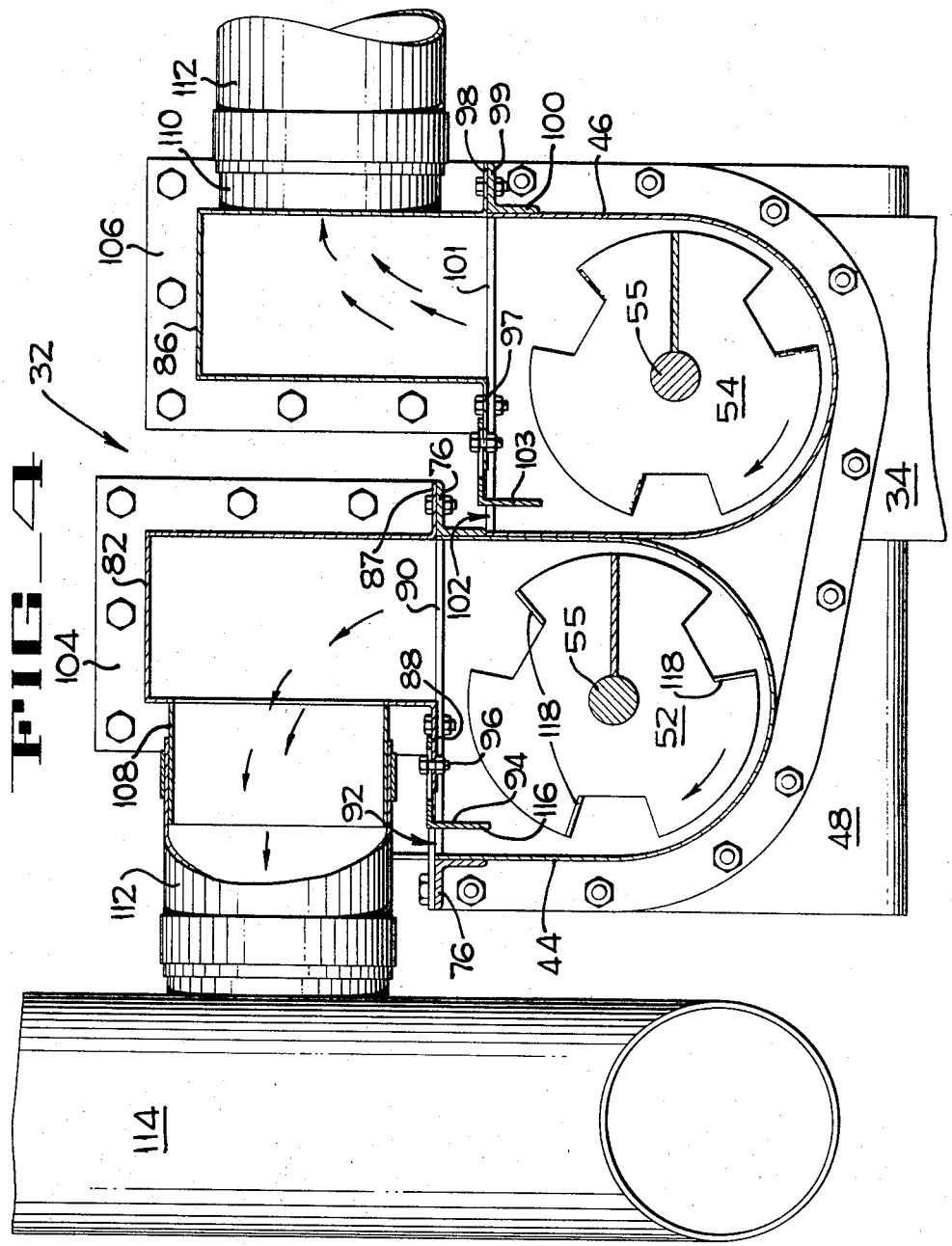

3,471,298
METHOD OF PROCESSING CEREAL GRAIN
Katsuji Hirahara, San Jose, Calif., assignor to FMC Corporation, San Jose, Calif., a corporation of Delaware
Filed Apr. 6, 1965, Ser. No. 445,912
The portion of the term of the patent subsequent to Aug. 15, 1984, has been disclaimed
Int. Cl. A23k 1/00; A23b 9/00
U.S. Cl. 99—2                              5 Claims

ABSTRACT OF THE DISCLOSURE

Milo is cooked in saturated steam at about 50–75 p.s.i.g. for about one minute and then cooled to about 160–175° under atmospheric pressure before rolling into flakes.

---

The present invention pertains to the processing of cereal grains to increase their digestability by animal enzymes.

More specifically, this invention provides method and apparatus improvements to the grain cereal processing method disclosed in the pending patent application of Frank D. Hickey, Ser. No. 340,288, now abandoned which application has been assigned to the assignee of the present invention. Both the instant application and said pending application concerned mass production techniques for processing animal feed from cereal grains, such as milo, so that the carbohydrate content of the cereal is more readily converted to dextrose by enzymes in the digestive systems of animals. Accordingly an animal assimilates maximum nutrients from the cereal and the weight gain of an animal fed the processed cereal is greater than the weight gain when the animal is fed the same amount of unprocessed cereal.

The susceptibility of starch in cereals to enzymatic conversion to dextrose can be measured by usual laboratory procedures that determine the amount, in milligrams, of dextrose released per gram of cereal sample. An important discovery of the Hickey grain processing method is that under certain cooking environments and conditions, the dextrose release is radically increased for milo, and produces valuable gains for other cereals. Under such conditions, however, it has been found that the operation of the processing apparatus must be periodically interrupted. This is due to the fact that part of the process requires that the cooked cereal be deformed to disorganize the cellular tissue structure as by forcing it between driven rollers to form flakes, or by crushing it. It has been found that if certain grains are deformed at an elevated temperature, the rollers or other deforming apparatus becomes clogged up. Also, it has been found that when certain grains are deformed while they are at an elevated temperature, they have substantially the above-mentioned, improved nutritional characteristic but they tend to harden in storage and become difficult to handle.

The cereal processing method, and apparatus for carrying out the method, of the present invention relates to the discovery that for any particular set of cooking conditions the detrimental buildup of material on the rollers and the poor storage characteristics can be minimized if the moisture condition of the cereal, or the temperature of cereal, or both, is brought to predetermined values just before the cereal is subjected to a crushing or rolling action.

An object of the present invention is to provide a continuous processing method for producing cereal grains to attain high dextrose release.

Another object of the invention is to provide a cooling conveyor for cooked cereal grains, the conveyor having large volume capacity, a high rate of heat transfer for rapidly reducing the temperature of the cereal, and having relatively small physical size.

Another object is to provide a cereal cooking process including a cooling step which maintains the cooked cereal at an efficient moisture content wherein the cereal is plastic but non-gummy and can be continuously fed into a rolling or crushing mill without necessitating periodic shutdown of the mill.

A further object is to provide a cereal cooking and flaking process which enables the flaked cereal to be stored without the flakes adhering to each other.

Another object is to provide an efficient cooling apparatus for a grain processing system.

Other objects and advantages of the present invention will become evident from the following description and from the accompanying drawings, wherein:

FIGURE 1 is a schematic side elevation, partly broken away, of the cooling conveyor of the present invention associated with a continuous pressure vessel and rolling mill for carrying out the method steps of the invention.

FIGURE 2 is a schematic horizontal section taken along lines 2—2 of FIG. 1, at an increased scale, and includes a blower mechanism omitted from FIGURE 1.

FIGURE 2A is an enlarged schematic vertical section taken along lines 2A—2A on FIGURE 2.

FIGURE 3 is an enlarged fragmentary perspective of a helical conveying screw used in the cooling apparatus of FIG. 2.

FIGURE 4 is a schematic transverse section taken generally along lines 4—4 on FIGURE 2.

In one system for carrying out the processing method of the present invention, both the temperature and the moisture content of the cereal was lowered before the cereal was directed into the crushing rollers. The present system includes a continuous pressure vessel 10 (FIG. 1) which may be of the type disclosed in U.S. Patent No. 2,534,648, or of the type disclosed in the above-identified pending patent application of Hickey Ser. No. 340,288 which has been abandoned for continuation application, Ser. No. 448,568, now Patent No. 3,336,137. The pressure vessel 10 is provided with an inlet hopper 12 that is mounted on an inlet pressure valve 14 atop an elongate cylindrical housing 16. The housing encloses a helical conveyor screw 18 which is rotated, by a variable speed drive unit 20 and a drive train 22, to advance grain material fed thereto by the hopper 12 and inlet pressure valve 14, to a discharge pressure valve 24. The pressure valves 14 and 24 include driven, vaned rotors 26 which transfer material to and from the pressure vessel 16, and isolate the interior of the vessel from atmosphere. The pressure valves may be of the type disclosed in the De Back Patent 2,638,137.

The housing 16 is provided with an inlet conduit 28 for the admission of saturated steam at a predetermined pressure up to 100 p.s.i.g. for cooking the cereal while it is conveyed by the helix 18 to the discharge pressure valve 24. By regulating the variable speed drive unit 20, the cooking time for a given amount of cereal can be varied between about 15 seconds to 5 minutes. From the valve 24, the cooked cereal is released to atmospheric pressure through a duct 30 (FIG. 2) which communicates with a cooling unit 32 that conveys the cooked cereal toward the left (FIG. 2) along the interior of a housing 44 and then returns it to the right along a housing 46 to a discharge conduit 34 (FIG. 1). The outlet of the conduit 34 may be controlled by a slide valve and is arranged to direct the cooked cereal into a distributing conveyor comprising a helical screw 35 rotated in a shell 36 having three gravity-fed outlets (not shown). Each outlet directs the cooked cereal into a separate rolling mill 37 (one only being shown) having coacting, driven flaking rollers that deform the cereal by rolling it into thin flakes. The rolling mills may be of the type known as Memco Mills manufactured by the Mill and Equipment Machinery Company of Oakland, Calif., with rollers 18 inches in diameter and 36 inches long; each mill of this type is rated at about five tons output per hour under the conditions later set forth. In FIGURE 1, one of the rolling mills is schematically represented by rollers 38 and 39 that are driven by a drive train 40.

As disclosed in the aforementioned patent application Ser. No. 340,288, the combination of the cooking and rolling operations under specified conditions cause the grain material to achieve a high dextrose release. The thus produced feed, or feed supplement, is collected in a bin 42 (FIG. 1) or is otherwise gathered for use or storage.

As mentioned above, an important feature of the process is that the cereal be rolled while it is plastic in order to break down the starch molecules, but certain cereal grains are excessively gummy if they are too hot, and crumble easily if they are too cool. In either case, hot or cool, the moisture content and rolling temperatures must be within certain established limits for effective rolling to achieve high dextrose release consistent with a mass production process. In attempting various solutions, it was discovered that cooling the cereal to a temperature below 175° F., provided that such cooling was effected within about five minutes between discharge from the cooker and entrance to the flaking rollers, would render the cereal suitably plastic and moist, but ungummy, for rolling in various ambient temperature and moisture conditions, and for production rates in the order of thirteen tons per hour with a 24 inch diameter helix in the continuous pressure vessel 10. Tests have shown that cooked milo, for instance, can be advantageously prepared under the following conditions:

In a test run raw milo, having an initial moisture content of about 12% by weight, was cooked for 1.5 minutes in saturated steam at 60 p.s.i.g. and was released to atmosphere at an ambient temperature of 101° F. and having a relative humidity of 50–87% and was then cooled to 170° F. and rolled into flakes. Before rolling, the cooked cereal had a moisture content of 15.0–15.6% by weight, and after rolling and being conveyed to storage, the temperature of the flakes was approximately 130–135° F. Under these conditions, the flaked cereal had a high dextrose release characteristic, yet the flaking operation did not tend to build up layers of cereal on the flaking rollers, and the flakes exhibited no tendency to become excessively cementitious or consolidated when stored.

Further, it was determined that when using the apparatus of the present invention wherein the moisture content of the cereal is lowered as the temperature is lowered, the cooling of the cooked cereal before flaking should be limited to a range of 120° F. to 175° F. because at temperatures lower than the former temperature, excess fines are produced, while at temperatures higher than the latter temperature, the cereal tends to build up on the flaking rollers and make periodic cleaning of the rollers necessary. It was further determined that the moisture content of the cereal after cooking and before rolling should fall within the range of between 15 and 20 percent by weight for optimum rolling efficiency within the above-specified temperature range. It should also be noted that the disorganization of the starch molecules of a cereal will vary with the cooking conditions, the greater the temperature and time, the greater will be the disorganization of the molecules. Such disorganization of the starch molecules contributes to the gummy characteristic of the cereal and its tendency to build up on the flaking rolls. Accordingly, the cooking conditions are a factor in the successful operation of the present method. It has been found that when cooking pressures of between 30 p.s.i.g. and 75 p.s.i.g. are used, and the cereal grains are brought into the above-mentioned ranges of temperature and moisture content, the continuous preparation of cereal grains having the desirable high-dextrose release characteristics is realized.

The following table gives specific examples demonstrating the dextrose release of milo as related to cooking times and pressures; and rolling temperature and moisture contents.

TABLE I

| Cooking Condition | | Milo Rolling Conditions | | Dextrose Release Conversion Value* |
|---|---|---|---|---|
| Time, min. | Pressure, p.s.i.g. | Moisture Content, percent | Temperature, °F. | |
| 1 | 75 | 16.9 | 172 | 480 |
| 1 | 60 | 17.3 | 162 | 440 |
| 1 | 50 | 17.4 | 160 | 360 |

*Dextrose release conversion value of cereal treated in commercial steam chest by atmospheric steam is 56–100.

The above table demonstrates the effectiveness of the process under the various processing conditions set forth, as measured by the output at one set of flaking rollers. Each processing run was continuous and the cereal did not build up on the flaking rollers. The moisture content of the cereal was measured by percent of weight per sample, and the dextrose release was measured in milligrams of dextrose per gram of sample.

It should be noted that the relatively high pressure cooking conditions listed in the table are those that cause the cereal to become gummy and create the most adverse rolling conditions. Accordingly, it will be evident that control of the moisture content and temperature conditions of the cereal when it is about to be rolled will also eliminate the cereal buildup on the rolls when cereal is cooked at pressures lower than those listed.

The cooling unit 32 (FIGS. 2 and 4) includes the elongated U-shaped shell or housing 44 which is in contiguous, generally parallel relation to the shell or housing 46, both shells having their ends closed by end closure plates 48 and 50. The shells 44 and 46 are associated with helical blade screw conveyors 52 and 54, respectively. Each helix screw is provided with drive shaft 55 which is rotatably journalled in several bearings 56 that are mounted on the end closure plates 48 and 50, and on intermediate bearing brackets, not shown.

As shown in FIGURE 2, the drive shafts 55 extend through the end plate 48 and are interconnected by a chain and sprocket drive 58 whereby driving force, which is applied to the helix screw 54, rotates the helix screw 52. The screw 54 is driven by a motor 60 (FIG. 1), a chain 62, and a gear reducer 64 that is coupled to the driveshaft 55 of the helix 54 exteriorly of the end plate 50.

The threads of the screws 52 and 54 (FIG. 2) are spiralled in opposite directions, the screw 54 being provided with a right hand thread and the screw 52 with a left-hand thread. Both screws are driven clockwise, as viewed from the motor 60, whereby the screw 52 conveys material from the duct 30 toward the end plate 50, and the helix screw 54 conveys material in the opposite direction.

Adjacent the discharge end of the helix 52 and the inlet end of the helix 54, the housings 44 and 46 (FIG. 2) are provided with adjacent wall portions that have coextensive notched portions 66. The lower edges of the notches are approximately in a horizontal plane including the axis of the drive shaft 55 of screw 52, and the notches are directly alongside an area swept by a transfer blade 68 on the discharge end of the helix screw 52. The transfer blade is formed of two coplanar plates 70 which extend radially from the drive shaft 55 between the end wall 50 and the adjacent end of the helix screw 52. The purpose of the transfer blade 68 is to move the cooked cereal at the discharge end of the helix screw 52 through the passage provided by the notches 66 to the inlet end of the helix screw 54.

As shown in FIGURE 4, the helix screw 52 is at a higher elevation than the helix screw 54. Accordingly, as the transfer blade moves clockwise, it engages the cereal in the housing 44, raises it along the inner surface of the outside wall of the housing and then carries it across the top of the screw 52 and thrusts it through the notched portions 66 (FIG. 2) onto the helix screw 54. The helix screw 54 is thus continuously fed by the helix screw 52, and conveys the cooked cereal material toward the discharge conduit 34 (FIG. 1) for delivery to the three rolling mills.

Returning now to the inlet duct 30 (FIG. 2), the lower end portion of the duct 30 is secured to a cover plate 74 that is bolted to lateral flanges of angle bars 76 (FIG. 4) which extend along the outside of the housing 44 between the end plates 48 and 50. The cover plate 74 is necessitated by the fact that the cooked cereal is emitted from the cooker with steam vapor which rapidly expands in volume when it is released to atmosphere from tis former pressure environment, and the cover plate 74 prevents it from overflowing from the housing 44.

Adjacent the downstream end of the cover plate 74, a pair of baffles 78 and 79 are bolted to the flanges of the angle bar 76. These baffles, which permit steam vapor to escape to atmosphere from the housing 44, decline in the direction of conveying movement so as to urge the expanded cereal mass downward onto the helix screw 52 while permitting relatively free flow of the hot vapors to atmosphere.

The cereal is cooled, as it travels along the housings 44 and 46, by streams of air that is drawn through the housing. The air leaves housing 44 through a downwardly opening plenum chamber 82 (FIGS. 1 and 2) which is mounted atop the housing 44 and extends from the baffle 78 to a point overlying the transfer blade 68, but spaced from the adjacent end wall 50 of the housing 44, as best shown in FIGURE 1. Between the plenum chamber 82 and the wall 50, the housing 44 is sealed by a removable cover plate 84 which also covers the corresponding area of the helix shell 46. A downwardly opening plenum chamber 86 is mounted on the housing 46 alongside the plenum chamber 82 for drawing air through housing 46.

The plenum chamber 82 (FIG. 4) has sheet metal walls defining an elongate chamber, said walls having base flanges 87 and 88. Flange 87 is bolted to the corresponding flange of one of the angle bars 76, and to a plurality of transverse bars 90 (FIG. 2) that are welded across the open upper end portion of the housing 44 in flush relation with the top flanges of angle bars 76. The flange 88 (FIG. 4) of the plenum chamber 82 is spaced from the adjacent angle bar 76 to provide air intake slots indicated at 92 on FIGURES 2 and 4, which slots can be varied in width by adjustable damper plates 94. Each damper plate 94 is slotted to receive attachment bolts 96 that secure the plate to the flange 88 so that the damper plate can be adjustably positioned in spaced relation to the angle bar 76 and locked in place when the desired air intake slot dimension is determined.

The plenum chamber 86 (FIGS. 2 and 4) is defined by a housing having base flanges 97 and 98 and is mounted in the same way as the plenum chamber 82 upon a lateral flange 99 of an angle bar 100 that is secured to the upper, outer edge of the housing 46, and upon lateral bars 101 which are welded across the open upper end portion of the housing 46 in flush relation with the angle bar 100. The air intake slots 102 (FIG. 4) for the housing 46 are adjacent the inner flange 97 of the plenum chamber 86. A plurality of damper members 103 are bolted to the inner flange 97, in the same manner as the damper members 94 are mounted, so that the air intake slots 102 can be varied in width. It will be noted that the inner flange 87 (FIG. 4) for the plenum chamber 82 overlies the slots 102.

Each plenum chamber 82 and 86 (FIGS. 2 and 4) is formed in two sections with bolted flange connections 104 and 106, respectively, which stiffen the walls of the plenum chambers near a pair of outlet ducts 108 and 110. A duct 112, connected to the suction side of a continuously driven centrifugal blower 114, is connected to each outlet duct 108 and 110 (FIG. 4) so that, in operation, the plenum chambers 82 and 86 are maintained at subatmospheric pressure in order to draw atmospheric air through the air intake slots 92 and 102.

The plenum chambers 82 and 86 operate in substantially the same manner. In the case of the plenum chamber 82, the velocity of the incoming cool air, that is drawn from atmosphere through the air intake slots 92, and guided by the depending vertical flanges 116 of the damper member 94, causes the air to be thrust toward the bottom of the housing 44 alongside its outer wall. Due to the direction in which the screw 52 rotates, the cooked cereal is thrust upward against the same outer wall and into the current of the air stream coming in the air intake slots 92. The incoming cool air thus impinges against the bulk of the heated material being conveyed by the helix screw 52.

It is an important feature of the cooling unit 32 that the helix screws 52 and 54 (FIGS. 3 and 4) are each provided with a plurality of spaced peripheral, axially extending tabs 118 (FIG. 3) that are formed by outwardly bent and partially severed portions of the helix blade. The tabs 118 are substantially parallel to the rotational axis of the helix driveshafts 55 and are at the leading ends on the thrust side of the blades. Accordingly, in the case of the helix screw 52, the heated cereal material thrust upward toward the air intake slots 92 is prevented from remaining in a cohesive mass and is separated by the tabs into small clumps or individual particles so that the cereal is aerated to rapidly transfer heat from the cooked cereal to the incoming relatively cool air. Moreover, the path of the heated air is directly and immediately upward from the helix screw into the plenum chamber, whereby a constant and plentiful supply of cool air is always provided to aerate the heated cereal.

When the cooling cereal reaches the transfer blade 68 at the discharge end of the helix screw 52, the cereal is thrust laterally through the notches 66 of the housings 44 and 46 onto the inlet end of the helix screw 54. It will be seen in FIGURE 4 that the left-hand thread helix screw 54 thrusts the material up the side of the housing 46 toward the air intake slots 102, and thus operates in the same manner as the helix screw 52 to effect rapid heat transfer from the cereal to the air traveling toward the exhaust duct of its associated blower 114.

As an example of the efficiency achieved by the cooling unit 32, it has been found that at a cooking pressure of 60 p.s.i.g. approximately 307° F. milo can be cooled to approximately 170° F. by the time it reaches the discharge conduit 34, while the throughput for three sets of flaking rollers approaches thirteen tons per hour. Further, the loss of plasticity of the grain is minimized by the relatively rapid handling of the cereal, such that the percent of moisture by weight and temperature is at an optimum for the rolling operation. As an example of the moisture loss which occurred during a typical processing run, the milo after cooking, but before cooling, contained 19.5 percent moisture by weight, and after cooling to below 170° F. had a moisture content of 17.7 percent.

Ambient temperature and humidity conditions affect the roll moisture of the cooked cereal handled by the cooling unit 32. In conditions of high ambient temperature and/or low humidity, the cooked cereal can be brought up to the proper moisture range by the use of cool water sprays. An advantageous location to use such sprays, and one which has proved satisfactory in production tests, is in the area of the transfer blade 68 (FIG. 2). Ordinary spray heads, not shown, can be easily mounted under the removable cover plate 84 and are thus readily accessible for adjustment or repair.

From the preceding description, it will be evident that the herein disclosed cereal processing method, and apparatus for effecting such method, constitutes a noteworthy advance in the art of processing cereal grains at continuous, mass production rates, while maintaining a high dextrose release rate for the flaked product, which product can then be stored and used at any convenient time, rather than having to be immediately used as was formerly the case.

Having thus described the invention, that which is believed to be new and for which protection by Letters Patent is desired is:

1. A method of forming flake cereal grain wherein the starch molecules of the flakes have been disorganized to facilitate dextrose release, comprising the steps of cooking raw grain at normal low moisture content in saturated steam in the pressure range of 30–75 p.s.i.g. and for a time sufficient to disorganize the starch molecules in the grain and raise its moisture content to not substantially more than 25% by weight; cooling the grain thus cooked down to a temperature range of 120° F. to 175° F. and at substantially atmospheric pressure; and flattening the grain thus cooled to form flake as well as to expose the starch molecules.

2. The method of claim 1, wherein said pressure range is about 50–60 p.s.i.g.

3. The method of claim 1 or 2, wherein said cooking time is in the range of from about 1 to about 1.5 minutes.

4. The method of claim 1 or 2, wherein said cooking temperature is in the range of about 160° F. to 175° F.

5. The method of claim 1 or 2 wherein said cereal grain is milo.

References Cited

UNITED STATES PATENTS

| | | | |
|---|---|---|---|
| 332,073 | 12/1885 | Gillman et al. | 99—80 |
| 427,159 | 5/1890 | Currie | 99—237 |
| 437,964 | 10/1890 | Bates | 99—80 |
| 491,428 | 2/1893 | Hudnut | 99—80 |
| 911,408 | 2/1909 | Jensen | 99—237 |
| 1,574,210 | 2/1926 | Spaulding | 99—80 |
| 3,181,955 | 5/1965 | Altman | 99—80 |
| 3,336,137 | 8/1967 | Hickey | 99—2 |

RAYMOND N. JONES, Primary Examiner

U.S. Cl. X.R.

99—237